United States Patent
Ganesan et al.

(10) Patent No.: US 6,200,611 B1
(45) Date of Patent: Mar. 13, 2001

(54) COATED POPCORN BARS AND METHODS FOR FORMING

(75) Inventors: Ganesh S. Ganesan, Maple Grove; Michael A. Helser, Minneapolis; Myron M. Uecker, Buffalo; Todd W. Gusek, Crystal, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 08/349,300

(22) Filed: Dec. 5, 1994

Related U.S. Application Data

(63) Continuation-in-part of application No. 29/028,479, filed on Sep. 16, 1994, now Pat. No. Des. 360,969.

(51) Int. Cl.[7] .................. A23P 1/00; A23P 1/08; A23L 1/18
(52) U.S. Cl. .............. 426/93; 426/89; 426/103; 426/274; 426/285; 426/297; 426/305; 426/517; 426/518; 426/660; 425/308; 425/315; 425/371; 425/404
(58) Field of Search .................. 426/89, 93, 103, 426/285, 297, 274, 307, 660, 517, 518; 425/371, 404, 308, 315

(56) References Cited

U.S. PATENT DOCUMENTS

| 2,181,109 | * | 11/1939 | Dodge | 426/93 |
|---|---|---|---|---|
| 3,009,427 | | 11/1961 | Bell . | |
| 3,617,309 | | 11/1971 | Rebane . | |
| 3,958,018 | * | 5/1976 | Tay | 426/103 |
| 4,098,914 | * | 7/1978 | Knechtel | 426/660 |
| 4,379,139 | | 4/1983 | Dawson . | |
| 4,652,456 | | 3/1987 | Sallsbury . | |
| 4,719,117 | * | 1/1988 | Simelunas | 426/517 |
| 4,849,233 | | 7/1989 | Hemker . | |
| 4,888,180 | | 12/1989 | Wu . | |
| 5,106,636 | * | 4/1992 | Ban et al. | 42/517 |

FOREIGN PATENT DOCUMENTS

| 3602464 | 7/1987 | (DE) . |
|---|---|---|
| 0348196 | 12/1989 | (EP) . |
| 8800797 | 2/1998 | (WO) . |

* cited by examiner

*Primary Examiner*—Helen Pratt
(74) *Attorney, Agent, or Firm*—L. MeRoy Lillehaugen; John A. O'Toole; Alan D. Kamrath

(57) ABSTRACT

An apparatus (10) for forming popcorn bars utilizing methods according to the preferred teachings of the present invention is disclosed where popcorn popped in an air popper (12) and coated with a molten binder in the form of a caramel syrup in an auger mixer (20) is compressed into a sheet by a device (32). In the sheeting device (32), the coated popped popcorn is drawn into and passes between an input conveyor (30) and a compressing conveyor (34) arranged at a non-parallel angle thereto. An air manifold (37) directs cooled air to the upper surface of the compressing conveyor (34) to cool the belting (36) thereof, with the cooled air being deflected to cool a spreader box (28) which receives the coated popcorn from the auger mixer (20) and distributes it on the input conveyor (30). The coated popcorn is cooled while being transported by a transport conveyor (44) including belting in the form of a mesh by a multiplicity of fans (46) located above and below the transport conveyor (44) and mounted on a movable support. The sheet is cut into strips which can then be separated and cut into the desired lengths.

22 Claims, 3 Drawing Sheets

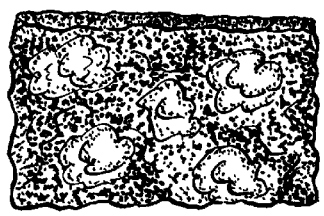
FIG. 4
FIG. 5
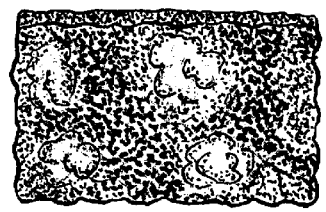
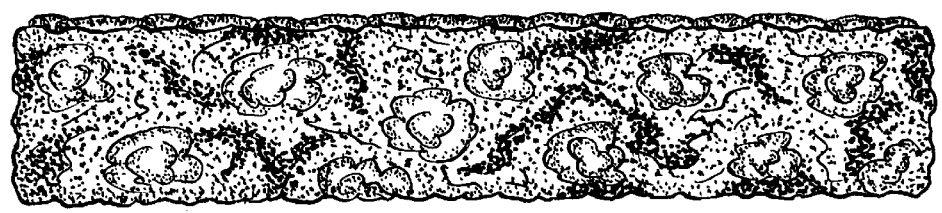
FIG. 6
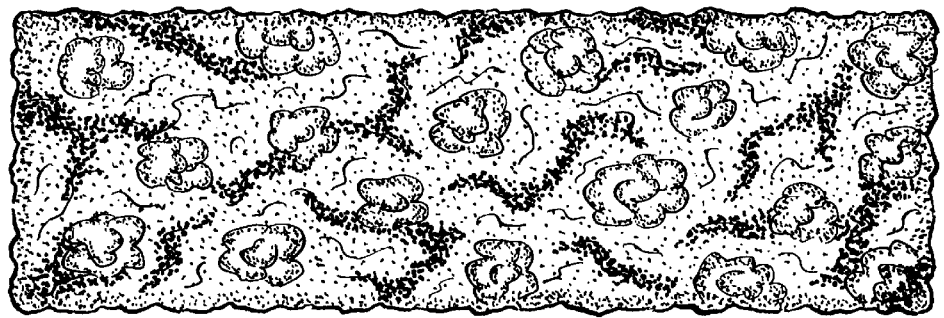
FIG. 7

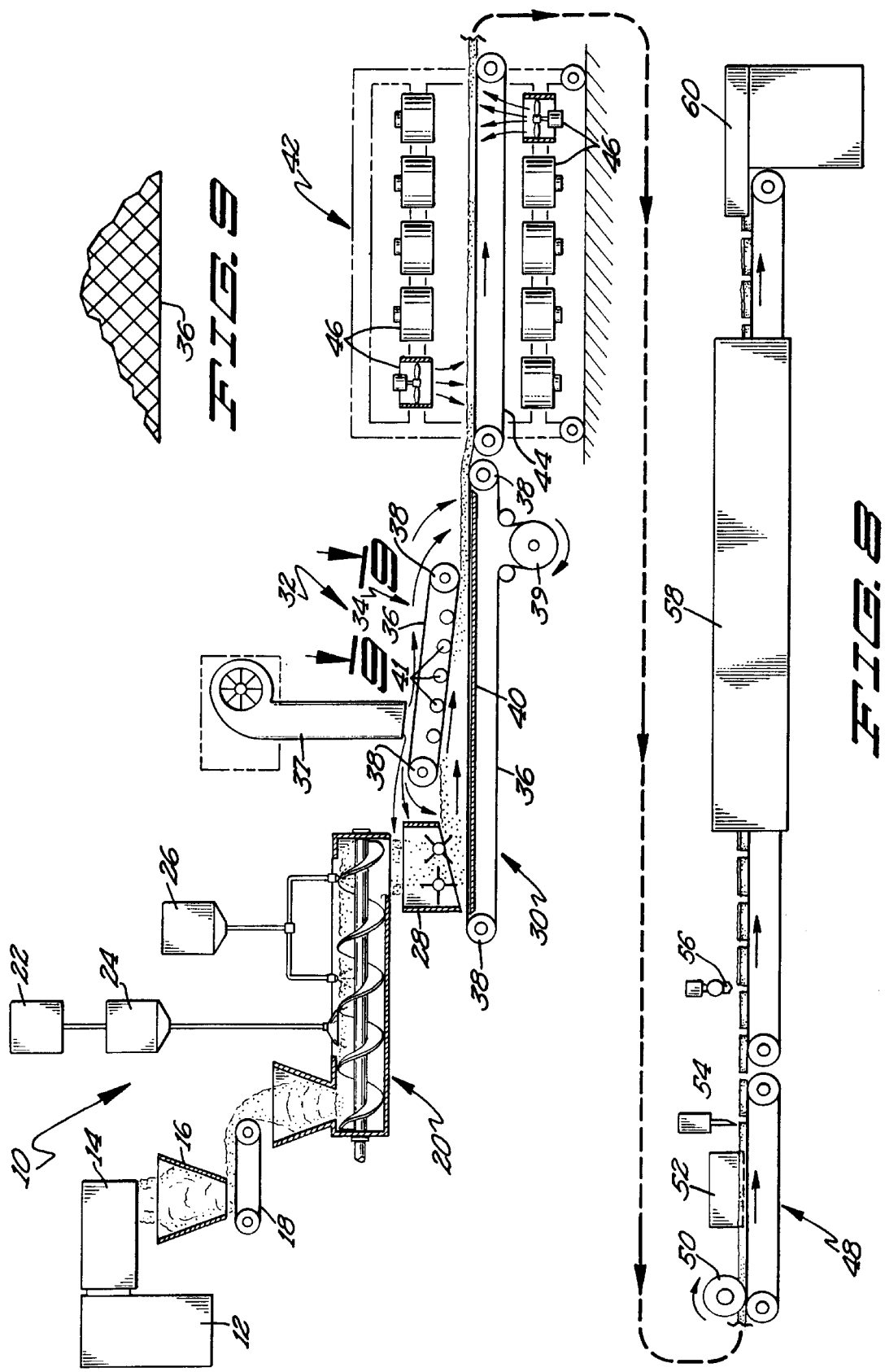

COATED POPCORN BARS AND METHODS FOR FORMING

CROSS REFERENCE

The present application is a continuation-in-part of application Ser. No. 29/028,479 filed Sep. 16, 1994, now U.S. Pat. No. 360,969.

BACKGROUND

The present invention generally relates to methods and apparatus for forming shaped popcorn products, specifically to methods and apparatus for forming popcorn bars, and particularly to methods and apparatus for forming coated popcorn bars.

With the increasing awareness of nutrition and healthy eating, popcorn has become increasingly popular as a snack. Typically, kernel popcorn is popped such as in a microwave oven and consumed as popped popcorn. It can then be appreciated that in addition to the time and effort required to pop the kernel popcorn, popped popcorn is also not as easily handled and consumed as other snack products such as candy bars or the like which can be stored for indefinite time periods, can be easily transported in a pocket, brief case, lunchpail, or the like, and can be immediately consumed when removed from the wrapper or other packaging.

Although popcorn balls and other shaped popped popcorn products such as described in U.S. Pat. No. 4,849,233 exist, such products have not achieved significant market success. Specifically, in addition to taste and other market appeal factors including handling and aesthetics, the shapes of the products are made by compression in stamping, molding, or similar devices, either manually or mechanically. Such methods of manufacture increase the cost of the product and detract from their competitiveness with other types of snack-type foods.

Thus, a need exists for shaped popcorn products which overcome the disadvantages and limitations of prior popcorn balls and other shaped popcorn products and provide a healthy, competitive alternative to other types of snack-type foods. In this respect, it is an aim to provide unique methods and apparatus for forming shaped popcorn products and in particular popcorn bars.

SUMMARY

These needs and other problems in the field of shaped popcorn products are solved by providing a popcorn bar, in the preferred form, formed by apparatus and methods where popped popcorn coated with molten binder in the most preferred form of a caramel syrup is compressed into a sheet in the most preferred form by being drawn into and passing between an input conveyor and a compressing conveyor arranged at a non-parallel angle and with decreasing spacing to the input conveyor and is cut into a plurality of strips in the most preferred form by parallel, spaced, rotating, slitter knives and then the strips are cut to the desired lengths in the most preferred form by a guillotine knife, with the bars in the preferred form being drizzled with a confectionery coating in a zig-zag pattern.

These and further aspects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 4 shows a right side elevational view of the popcorn bar of FIG. 1.

FIG. 5 shows a left side elevational view of the popcorn bar of FIG. 1.

FIG. 6 shows a rear elevational view of the popcorn bar of FIG. 1.

FIG. 7 shows a bottom plan view of the popcorn bar of FIG. 1.

FIG. 8 shows a diagramatic view of apparatus for forming the popcorn bar of FIG. 1 and utilizing methods according to the preferred teachings of the present invention.

FIG. 9 shows a partial, plan view of the belting of the conveyors of the apparatus of FIG. 8 taken along view line 9—9 of FIG. 8.

Figure 1:
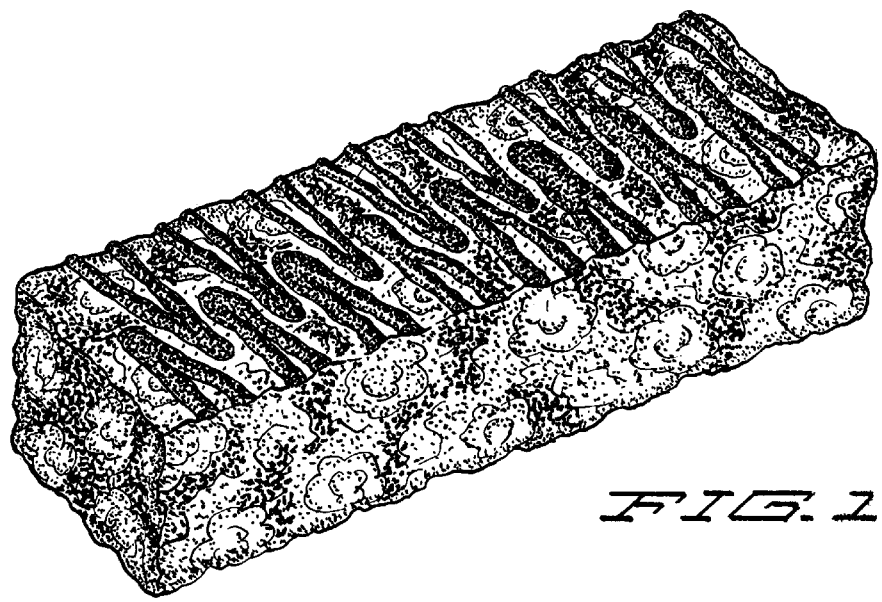
FIG. 1 shows a perspective view of a popcorn bar formed utilizing methods according to the preferred teachings of the present invention.
Figure 2:
FIG. 2 shows a top plan view of the popcorn bar of FIG. 1.
Figure 3:
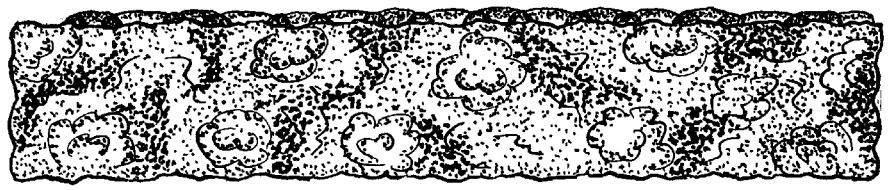
FIG. 3 shows a front elevational view of the popcorn bar of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "end", "edge", "side", "front", "back", "length", "width", "outer", and similar terms are used herein, it should be understood that these terms have reference only to the structure shown in the drawings as it would appear to a person viewing the drawings and are utilized only to facilitate describing the invention.

DESCRIPTION

An apparatus for forming a coated popcorn bar utilizing methods according to the preferred teachings of the present invention is shown in the drawings and generally designated 10. Apparatus 10 generally includes a popcorn popper 12 which in the preferred form is of the air-popping variety, with a Cretors commercial air popper being utilized in testing. In the most preferred form, mushroom variety popcorn is popped in popper 12. Apparatus 10 further includes a device 14 for receiving the popped popcorn from popper 12, for removing any unpopped, underpopped, and/or partial kernels, and for transporting the popped popcorn to a surge hopper 16. Device 14 can include bucket or similar elevators, suitable conveyors, surge hoppers, and separators as desired for convenience of placement and operation of popper 12 and hopper 16. Popped popcorn is removed from hopper 16 at a uniform rate by a suitable device 18 such as a weigh belt feeder.

Apparatus 10 further generally includes a device 20 for evenly coating the popped popcorn with a molten binder, which in the most preferred form is a caramel syrup. Device 20 in the preferred form is a steam-jacketed auger mixer. Caramel syrup is formed in the most preferred form from a mixture of water, sugar, corn syrup, molasses, salt, oil and lecithin heated to a temperature in the order of 180° F. (82° C.) such as in a steam-jacketed kettle 22. The mixture is then cooked at a temperature in the order of 300° F. (149° C.) in an evaporator 24, with a Groen commercial scraped surface evaporator being utilized in testing. In addition to the popped popcorn from device 18 and the cooked, molten syrup from evaporator 24, oil is sprayed by sprayer 26 into the auger mixer 20 to keep the popcorn from sticking to the sides and the screw of auger mixer 20 such that the popped popcorn is evenly coated with cooked, molten caramel and oil in the most preferred form. In the preferred form, the coated popcorn is discharged from auger mixer 20 at a temperature in the range of 250° F. (121° C.) to 270° F. (132° C.) and in the most preferred form in the order of 260° F. (127° C.). If the temperature at discharge is too cold, the coated popcorn is too brittle to form into sheets, strips, or bars. On the other hand if the temperature at discharge is too hot, more energy is required to cool the coated popcorn.

The coated popcorn is discharged from auger mixer 20 into a spreader box 28 which generally evenly distributes the coated popcorn onto the input conveyor 30 of a compressing and sheeting device 32, with input conveyor 30 moving in a conveying direction. Device 32 further generally includes a compressing conveyor 34 arranged at a non-parallel angle of a decreasing spacing in the conveying direction from conveyor 30. In the preferred form, conveyors 30 and 34 are formed from flexible plastic, continuous belting 36 extending around parallel end rollers 38. In the preferred form, end roller 38 of conveyor 34 at the entrance of device 32 is driven whereas belting 36 of conveyor 30 is driven by a drive roll 39 located intermediate and below end rollers 38, with drive roll 39 including suitable idler rolls for increasing the amount that belting 36 is wrapped on roll 39. Suitable support for belting 36 between end rollers 38 must be provided on the surface of conveyors 30 and 34 which engages the coated popcorn. In the preferred form, support for belting 36 of conveyor 30 is in the form of a plate 40 over which belting 36 slides. In the preferred form, support for belting 36 of conveyor 34 is in the form of a multiplicity of parallel rollers 41. It was found that the use of a multiplicity of parallel rollers to support belting 36 for both conveyors 30 and 34 did not operate in a satisfactory manner in apparatus 10 according to the preferred teachings of the present invention.

Further, belting 36 of conveyors 30 and 34 includes a textured or rough-type surface and in the most preferred form is in a diamond pattern or as cubes arranged along a diagonal pattern as best seen in FIG. 9. In the most preferred form, the length of the side of the cube in the pattern of belting 36 is generally equal to 2 millimeters. If belting 36 was smooth and did not have a rough-type surface, coated popcorn would not be drawn into and would not pass between conveyors 30 and 34. On the other hand, if the depressions are too deep in the texture of the surface of belting 36, the depressions have a tendency to leave marks on the final product. In the most preferred form of the present invention, the cubes of belting 36 have a depth in the order of 1 millimeter.

In the preferred form, an air manifold 37 is provided to direct cooled air towards the outer, textured surface of belting 36 on the upper surface of conveyor 34 adjacent to the entrance of device 32. In the preferred form, the cooled air from manifold 37 cools belting 36 to reduce the tendency of the coated popcorn to stick thereto. Furthermore, the cooled air tends to be deflected at a 90° angle along the upper surface of belting 36. In the preferred form, spreader box 28 has an upper extent above the upper surface of conveyor 34 and is positioned adjacent to the entrance of device 32 and air manifold 37. Thus, the deflected cooled air cools spreader box 28, passes between auger mixer 20 and spreader box 28 and cools the coated popcorn passing therebetween, and is also deflected by the spreader box 28 towards the coated popcorn positioned on input conveyor 30 prior to the entrance of device 32 formed by compressing conveyor 34. It should be noted that the surfaces of the mass of coated popcorn on input conveyor 30 can not be too cold as the outer pieces in the mass of coated popcorn will be too hard and will tend to squash as the mass is compressed into the compressed sheet by device 32. In the preferred form, the coated popcorn leaving spreader box 28 has a temperature in the order of 230° F. (110° C.) and has a temperature entering device 32 in the order of 210° F. (99° C.).

The coated popcorn is compressed and sheeted by device 32 in the most preferred form into a sheet having a thickness in the order of ¾ inch (1.9 cm) and a width in the order of 24 inches (61 cm) and specifically in the range of less than 24 inches (61 cm) to more than 24 inches (61 cm) such as but not limited to 32 inches (81 cm). The sheet leaving device 32 has a reduced temperature which is in the range of 170° F. (77° C.) to 190° F. (88° C.) and in the order of 180° F. (82° C.) in the preferred form. The sheet is then further, partially cooled to solidify the binder and bind the popped popcorn in the sheet by a cooling device 42 which in the preferred form shown is an ambient air cooling conveyor. Specifically, the belting of conveyor 44 is in the form of a mesh which allows exposure to air of the surface of the sheet which abuts with the belting. As all surfaces of the sheet are exposed to air, faster and more even heat transfer occurs through the sheet than if the sheet were supported on nonpermeable-type belting. In the preferred form shown, a multiplicity of fans 46 are arranged longitudinally parallel to the movement direction of the sheet and conveyor 44 and are positioned above and below conveyor 44 of device 42 to direct air towards the surfaces of the sheet abutting with and parallel to the belting of conveyor 44. In the preferred form, fans 46 direct ambient air towards the sheet; however, cooled air can be utilized if desired and/or necessary. Further, in the preferred form, fans 46 are mounted to a movable carrier such as a wheeled support for removal from conveyor 44 for servicing and/or cleaning thereof.

Apparatus 10 according to the present invention includes a device 48 for cutting the sheet into individual bars. Specifically, in the preferred form, device 48 includes parallel, spaced, rotating, slitter knives 50 for cutting the sheet into longitudinal strips having generally the desired widths of the popcorn bars which are the same for all strips in the order of 1¼ inches (3.2 cm) in the preferred form. After cutting, the longitudinal strips are separated by a spreader 52 before being cut by a knife 54 to the desired length of the popcorn bars which are the same for all bars in the order of 4 inches (10 cm) in the preferred form such as by guillotine cutter 54 in the preferred form. In the preferred form, spreader 52 is located before knife 54 because it is more difficult to separate the popcorn bars after they are cut to the desired length and it is desired that the popcorn bars are laterally separated and do not stick together in later processing steps. When guillotined, the strips have a surface temperature in the range of 95°–125° F. (35°–52° C.) and in the preferred form, the temperature of the top surface is in the order of 105° F. (41° C.), of the bottom surface is in the order of 120° F. (49° C.), and of the center is in the order of 180° F. (82° C.). If the temperature of the sheet or strips when cut or guillotined is too hot, the bound popcorn won't be cut or tends to reattach, and strings of sugar extending from the cut surfaces may result which is aesthetically undesirable. On the other hand, if the temperature is too cold, the bound popcorn is too brittle and tends to break or shatter. In this regard, if knives 50 and cutter 54 are operable in a satisfactory manner at higher temperatures, cooling device 42 could be repositioned after cutter 54 and/or knives 50 with cutter 54 and/or knives 50 providing a cleaner cut without breakage or shattering of the popped popcorn in the compacted sheet and strips.

After being cut to length, apparatus 10 includes a drizzling device 56 for drizzling the laterally separated, individual bars with a confectionery coating such as milk-chocolate or caramel flavoring. In the preferred form, the confectionery coating is drizzled on the top of the bars in a zig-zag pattern with a pitch of approximately ⅜ inch (1 cm). The confectionery coating is typically drizzled at a temperature above the setting temperature of the confectionery coating which in the most preferred form is in the order of 103° F. (39° C.) and in the most preferred form is in the range of 112°–115° F. (44°–46° C.). Drizzling device 56 is of a conventional design in the most preferred form. After being drizzled, the bars have a surface temperature in the range of 115°–145° F. (46°–63° C.) and a center temperature generally less than the center temperature before drizzling and in the preferred form in the order of 180° F. (82° C.). The bars are then cooled such as in a cooling tunnel 58 to a temperature to firmly set the confectionery coating and in the preferred form to a temperature in the order of 80°–90° F. (27°–32° C.).

After cooling tunnel 58, apparatus 10 according to the present invention includes a suitable device 60 for individually wrapping each of the individual bars and placing the wrapped bars in suitable packaging for sale.

The temperatures set forth are for forming popcorn bars according to the preferred teachings of the present invention during testing. It can then be appreciated that temperatures may be different in actual production of popcorn bars according to the present invention based upon several variables including but not limited to the particular components of and their arrangement in apparatus 10, the location and other environmental factors where production takes place, the particular ingredients utilized in formation of the popcorn bars, and the like.

It can then be appreciated that coated popcorn bars formed by the methods of the present invention such as by apparatus 10 have a top and bottom defined by the popped popcorn coated with the caramel syrup binder in a molten form compressed into the sheet, with the distance between the top and bottom defining a thickness which in the preferred form is in the order of ¾ inch (1.9 cm). The popcorn bar further includes first and second sides formed by cutting the sheet with knives 50, with the distance between the sides defining a width which in the preferred form is in the order of 1¼ inches (3.2 cm). The popcorn bar further includes first and second ends formed by cutting the strips with knife 54, with the distance between the ends defining a length which in the preferred form is in the order of 4 inches (10 cm). As, the popcorn bars are laterally spaced when the confectionery coating is drizzled thereon, the coating is in a zig-zag pattern on the top and may extend partially on the first and second sides of the popcorn bar.

The popcorn bars according to the present invention then provide a healthy, competitive alternative to other types of snack-type foods. Specifically, in addition to the taste, nutrition, and other healthy attributes of popcorn, the popcorn bars are very shelf stable and can be easily handled, consumed, and transported as a snack food. In addition, the popcorn bars have the aesthetics and other market appeal factors of a candy bar without the high levels of fat and other undesirable attributes. Likewise, the methods of the present invention allow the popcorn bars to be easily and rapidly produced, thus increasing their economic competitiveness with other types of snack foods.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Method for forming popcorn bars having a width and a length comprising the steps of: providing popped popcorn; providing a molten binder; removing any unpopped and any partial kernels from the popped popcorn; coating the popped popcorn with the molten binder after removal of any unpopped and partial kernels; compressing a mass of the coated popped popcorn into a compressed sheet; reducing the temperature of the coated popped popcorn to a temperature to solidify the binder and to bind the popped popcorn; cutting the compressed sheet with knives into a plurality of strips having a width equal to the width of the popcorn bars; and cutting the plurality of strips with at least one knife to a length equal to the length of the popcorn bars.

2. The method of claim 1 further comprising the step of drizzling a confectionery coating on the top of the popcorn bars.

3. The method of claim 2 further comprising the step of spreading the strips from each other, with the drizzling step also drizzling the confectionery coating on the cuts of the popcorn bars formed from cutting the sheet into the strips.

4. The method of claim 2 wherein the confectionery coating is selected from a group consisting of milk-chocolate and caramel flavoring.

5. The method of claim 1 wherein the compressing step comprises the steps of: distributing the coated popped popcorn on an input conveyor moving in a conveying direction; and providing a compressing conveyor arranged at a non-parallel angle to the input conveyor at a decreasing spacing in the conveying direction, with the coated popped popcorn being drawn into and passing between the input and compressing conveyors.

6. The method of claim 5 wherein the input and compressing conveyors each comprise, in combination: first and second, spaced, parallel end rollers, a continuous belting extending around the end rollers, and a support for the continuous belting between the end rollers, with the belting of the input and compressing conveyors including a textured surface.

7. The method of claim 6 wherein the textured surface is in the form of squares arranged along a diagonal pattern.

8. The method of claim 6 wherein the support of the input conveyor is in the form of a plate over which the continuous belting slides.

9. The method of claim 5 further comprising the step of directing cooled air towards the surface of the compressing conveyor opposite the input conveyor, with the step of distributing the coated popped popcorn comprising the step of receiving the coated popped popcorn with the molten binder in a spreader box, with the cooled air cooling the spreader box.

10. The method of claim 1 wherein the reducing temperature step comprises the steps of: transporting the coated popped popcorn having a surface supported on a belting formed of mesh allowing exposure of air to the surface supported on the belting; and directing cooling air towards the coated popped popcorn above and below the belting, with the coated popped popcorn having a surface opposite to the surface supported on the belting, with both surfaces of the coated popped popcorn being exposed to the cooling air.

11. The method of claim 1 wherein the step of cutting the sheet into strips comprises the step of passing the sheet under parallel, spaced, rotating slitter knives.

12. The method of claim 11 wherein the step of cutting the strips to length comprises the step of guillotine cutting the plurality of strips.

13. The method of claim 1 wherein the step of providing the molten binder comprises the step of providing,the molten binder in the form of caramel syrup.

14. The method of claim 13 wherein the step of providing the molten binder comprises the steps of: heating a mixture of water, sugar, corn syrup, molasses, salt, oil and lecithin to a temperature in the order of 82° C.; and then cooking the mixture at a temperature in the order of 149° C.

15. The method of claim 1 further comprising the step of removing any underpopped kernels from the popped popcorn prior to the coating step.

16. The method of claim 1 wherein the compressing step comprises the steps of: distributing the coated popped popcorn for movement in a conveying direction; and drawing the distributed coated popped popcorn into a decreasing spacing in the conveying direction, with the coated popped popcorn passing between the decreasing spacing as the coated popped popcorn moves in the conveying direction.

17. Method for forming popcorn bars having a width and a length comprising the steps of: providing popped popcorn; providing a molten binder; coating the popped popcorn with the molten binder; moving a mass of the coated popped popcorn in a conveying direction; passing the moving coated popped popcorn under a lower surface of a compressing conveyor moving in the conveying direction to compress the mass of the coated popped popcorn into a compressed sheet, with the compressing conveyor having an upper surface moving opposite to the conveying direction; directing cooling air towards the upper surface of the compressing conveyor for cooling the compressing conveyor; reducing the temperature of the coated popped popcorn to a temperature to solidify the binder and to bind the popped popcorn; cutting the compressed sheet with knives into a plurality of strips having a width equal to the width of the popcorn bars; and cutting the plurality of strips with at least one knife to a length equal to the length of the popcorn bars.

18. A The method of claim 17 wherein the compressing step further comprises the steps of: distributing the coated popped popcorn by a spreader for movement in the conveying direction, with the coating step comprising the step of mixing the molten binder and popped popcorn in a mixer, with the mixer discharging the coated popped popcorn into the spreader; and deflecting the cooling air by the upper surface of the compressing conveyor between the mixer and the spreader for cooling the coated popcorn passing therebetween.

19. The method of claim 17 wherein the compressing step further comprises the steps of: distributing the coated popped popcorn by a spreader for movement in the conveying direction; and deflecting the cooling air by the spreader towards the coated popped popcorn moving in the conveying direction.

20. Popcorn bar having a top, a bottom, first and second ends, and first and second sides comprising, in combination: popped popcorn; a binder for binding the popped popcorn in the form of a caramel syrup formed by heating a mixture of water, sugar, corn syrup, molasses, salt, oil and lecithin to a temperature in the order of 82° C. and then cooking the mixture at a temperature in the order of 149° C., with the top and bottom being defined by a mass of the popped popcorn coated with the binder in a molten form compressed into a sheet, with the ends and sides being formed by cutting the sheet with knives, with the coated popped popcorn between the ends and sides being substantially free of unpopped and partial kernels; and confectionery coating drizzled in a zig-zag pattern on the top.

21. The method of claim 1 wherein the compressing step comprises the step of compressing the mass of the coated popped popcorn into the sheet having a thickness in the order of ¾ inch (1.9 cm).

22. The popcorn bar of claim 20 wherein the zig-zag pattern of the confectionery coating extends on the first and second sides.

* * * * *